United States Patent [19]

Omberg

[11] Patent Number: 4,703,972
[45] Date of Patent: Nov. 3, 1987

[54] REAR SEAT AUTOMOBILE SUN VISOR-MIRROR ASSEMBLY

[76] Inventor: Cory Omberg, 1408 E. 7th St., Superior, Wis. 54880

[21] Appl. No.: 840,932

[22] Filed: Mar. 18, 1986

[51] Int. Cl.⁴ .............................................. B60J 3/00
[52] U.S. Cl. .............................. 296/97 R; 296/97 K; 248/231.8; 248/276; 297/191
[58] Field of Search .......................... 296/97 R, 97 K; 248/231.8, 284, 276; 297/191, 194

[56] References Cited

U.S. PATENT DOCUMENTS

| | | | |
|---|---|---|---|
| 2,255,973 | 9/1941 | Hoobler | 297/191 |
| 3,282,623 | 11/1966 | Paro | 296/97 R |
| 3,304,118 | 2/1967 | Jonas | 296/97 R |
| 3,751,106 | 8/1973 | Mahler et al. | 296/97 K |

Primary Examiner—Robert R. Song
Attorney, Agent, or Firm—Laurence R. Brown

[57] ABSTRACT

A detachable bracket-visor assembly provides for sunshade protection or rear viewing for rear seat automobile passengers. It attaches over the front seat-back or back window sill by means of a spring biased U-shaped bracket clip-on clamp, to which a multiple positionable bracket assembly is affixed for positioning the visor. This permits access of the visor at any position in the rear seat compartment for the convenience of the rear seat passengers. It provides sun shield protection or rear viewing for children in youth seats.

3 Claims, 3 Drawing Figures

REAR SEAT AUTOMOBILE SUN VISOR-MIRROR ASSEMBLY

TECHNICAL FIELD

This invention relates to automobile accessories, and more particularly it relates to adjustable sun-shield visors and/or mirrors which can be used by back seat passengers such as children in a youth seat.

BACKGROUND ART

It has been conventional to provide as automobile accessories sun-shield visors and mirrors for the driver and front seat passenger. These are generally permanently mounted in place in the front seat compartment above the windshield. Little attention has been given to such accessories for the back seat compartment passengers.

Mounting of any sort of sun-visor or mirror as an accessory in the back seat compartment presents a problem since there is no head room center mounting position other than the roof conventionally provided. The roof is not suited for mounting of such accessories. Also, generally, the rear seat holds three passengers, and accessibility of any visor or mirror to any passenger is desirable in a manner not seriously detracting from freedom of vision of the other passengers or the driver.

It is an objective of this invention therefore to provide improved sun-shield visor and/or mirror equipment adaptable for individually adjustable use by rear seat passengers in automobiles.

DISCLOSURE OF THE INVENTION

A sunshield visor and/or mirror (hereinafter visor) adjustable bracket assembly is specially adapted for installation in the rear passenger compartment of an automobile, so that the visor may be variably adjusted to the needs of any of its three passengers. It is thus mountable in various positions by means of a spring-biased U-shaped clamp that engages and frictionally holds the visor on either the back rest of the front seat or the window-sill panel of one of the rear windows. Then, by means of pivotable bracket arms between the clamp and visor, the visor may be adjusted to suit the needs of a rear passenger sitting in any of the three positions normally provided.

BRIEF DESCRIPTION OF THE DRAWINGS

In the accompanying drawings.

THE PREFERRED EMBODIMENT

Figure 1:
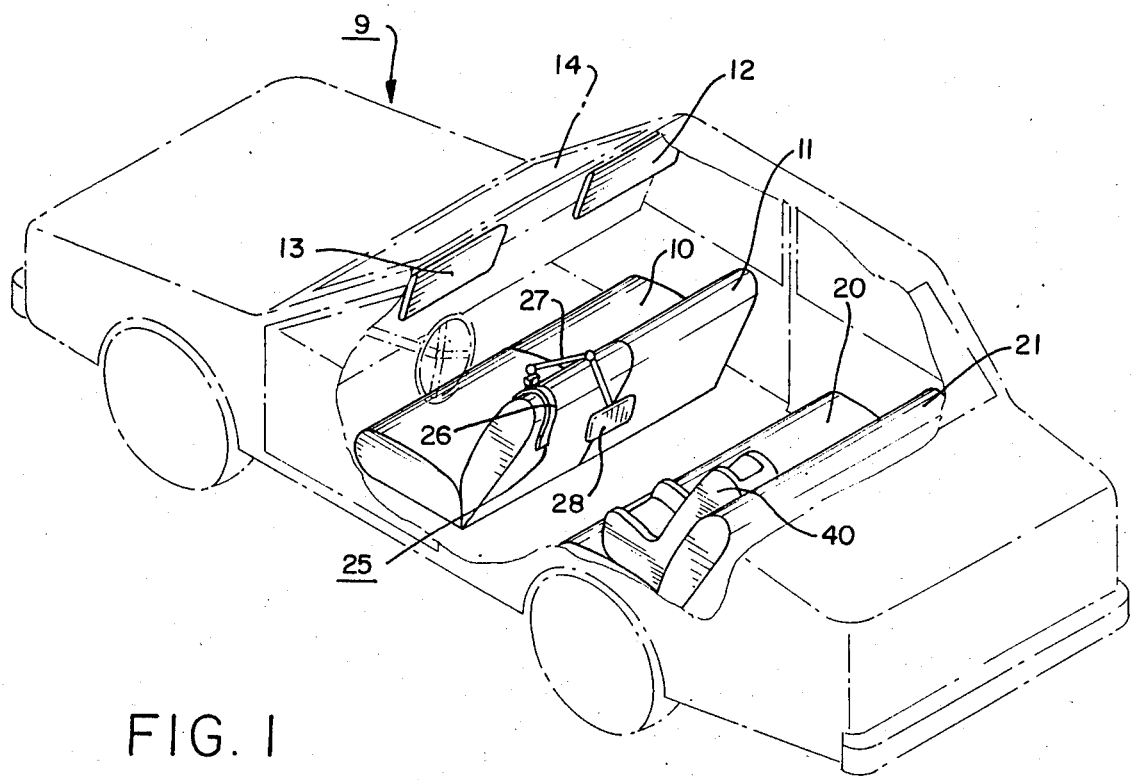
FIG. 1 is a partially cut away perspective sketch of the front and rear automobile passenger compartments, showing the mount of a bracket-visor assembly on the front seat back rest to afford accessibility to the rear seat passengers, as afforded by this invention.

In the automobile 9 of FIG. 1, a front passenger compartment has the seat 10, with back rest 11. Conventionally, visor accessories 12 and 13 are mounted above the windshield 14 with sun shields on the driver and passenger sides of the front seat 10, which generally seats two passengers. There is no provision made heretofore for any visor protection for rear seat passengers.

The rear seat compartment has a seat, generally for three passengers, with back rest 21 and youth seat 40. As provided by this invention, a bracket-visor assembly 25 is mounted on the back rest 11 of the front seat 10 by means of a clip-on U-shaped spring-biased clamping member 26. It can be moved to any desirable position to accomodate side or center passenger needs. Pivotable bracket arms 27 couple the clamp 26 to the visor 28 for variable positioning at will.

Figure 2:
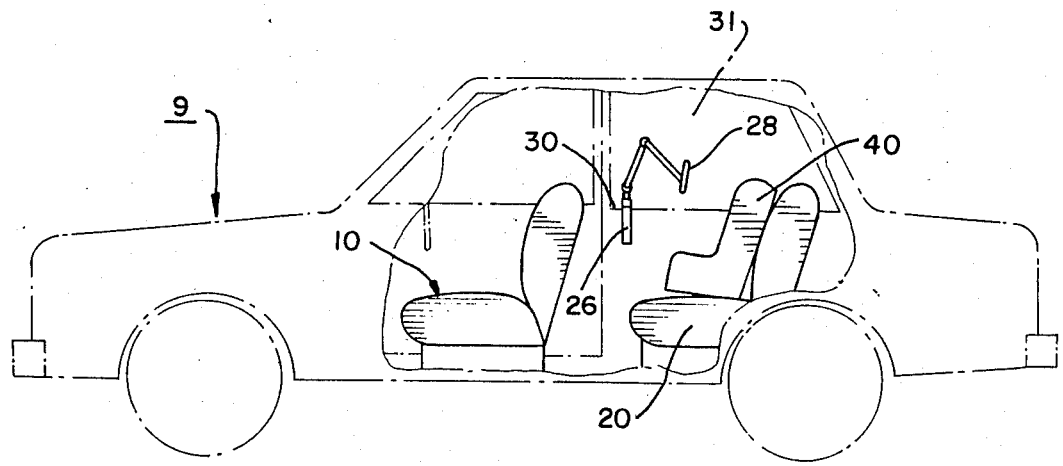
FIG. 2 is a partially cut away elevation sketch showing the bracket-visor assembly mounted on a rear window-sill ledge panel.

FIG. 2 shows an alternative mounting position, with the bracket-visor assembly clamp 26 mounted over the window-sill panel 30 of rear window 31. This permits the visor 28 to be positioned conveniently by the adjacent one of the side passengers on rear seat 20, such as a child in youth seat 40.

Figure 3:
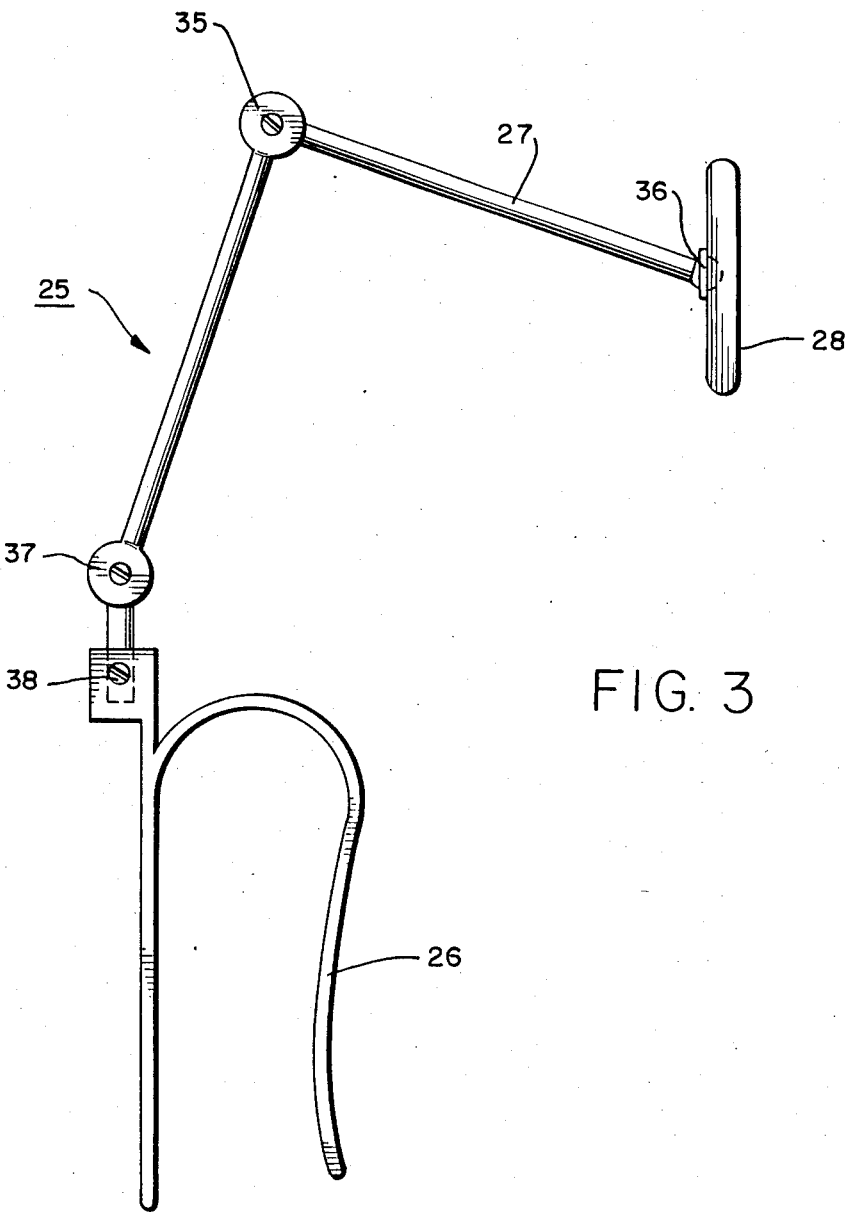
FIG. 3 is a sketch of a typical bracket-visor assembly embodiment of the invention.

A typical bracket-visor assembly 25 is shown in FIG. 3. Thus, two or more bracket arms 27 are pivoted at pivot joints 35 to 38 to permit universal movement of the visor to a wide range of positions. The clamp member 26 is of a construction that firmly holds the bracket assembly in place over the front seat back rest without damage to upholstery, etc. It may be of a spring plastic, or plastic coated spring members, for example.

The joints 36 to 38 may be friction mounted ball and socket construction, or may have serrated screw tightened swivel plate joints for a more rigid placement, as desired. It is evident that the construction is such that the visor 28, of appropriate size and sun shielding or mirror properties, can be selectively manipulated by a rear seat passenger to suit individual needs. A visor could have a mirror on one side for example for dual purpose use as a sunshield without a mirror, or as a rear view mirror adjustable for looking backwards out the rear car window.

There is thus provided by this invention a retrofit visor accessory for rear seat automobile passengers that does not require alterations for installation, and which affords rear seat passengers sun shield protection and rear viewing capabilities.

Having advanced the state of the art, those novel features of the invention believed descriptive of the spirit and nature of the invention are defined with particularity in the following claims.

I claim:
1. For use with an automobile having a rear seat behind a front driver's seat, a visor-bracket mount assembly comprising an inverted U-shaped clamp assembly having resiliently biased front and rear legs adapted to be clamped over an interior portion of the automobile, an upstanding projection from one of said legs of said U-shaped clamp, a pair of first and second visor-bracket arms one end of each of which is pivoted to the other and one end of said first arm is pivotally connected to said upstanding projection, and a visor pivotally connected to the free end of said second arm to variably position the visor for shielding at least one occupant of the rear seat from the sun.

2. A visor mount bracket assembly as claimed in claim 1 wherein the interior portion of the automobile over which said U-shaped clamp is clamped is a window sill panel shielding a back seat passenger.

3. A visor mount bracket assembly as claimed in claim 1 wherein the interior portion of the automobile over which said U-shaped clamp is clamped is the top of the back of the driver's seat.

* * * * *